US012238378B2

United States Patent
Lee

(10) Patent No.: US 12,238,378 B2
(45) Date of Patent: Feb. 25, 2025

(54) DISPLAY DEVICE

(71) Applicant: LG ELECTRONICS INC., Seoul (KR)

(72) Inventor: Kiwoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 432 days.

(21) Appl. No.: 17/595,728

(22) PCT Filed: May 23, 2019

(86) PCT No.: PCT/KR2019/006188
§ 371 (c)(1),
(2) Date: Nov. 23, 2021

(87) PCT Pub. No.: WO2020/235724
PCT Pub. Date: Nov. 26, 2020

(65) Prior Publication Data
US 2022/0256245 A1    Aug. 11, 2022

(51) Int. Cl.
*H04N 21/4728* (2011.01)
*H04N 21/422* (2011.01)
*H04N 21/431* (2011.01)

(52) U.S. Cl.
CPC ... *H04N 21/4728* (2013.01); *H04N 21/42209* (2013.01); *H04N 21/4316* (2013.01)

(58) Field of Classification Search
None
See application file for complete search history.

(56) References Cited

U.S. PATENT DOCUMENTS

| | | | | |
|---|---|---|---|---|
| 8,150,168 | B2 * | 4/2012 | Koda | H04N 21/4143 382/118 |
| 10,572,111 | B2 * | 2/2020 | Yokouchi | G06V 40/171 |
| 10,771,674 | B2 * | 9/2020 | Ono | G06T 5/73 |
| 10,796,157 | B2 * | 10/2020 | Chan | G06V 10/235 |

(Continued)

FOREIGN PATENT DOCUMENTS

| KR | 20110006832 | 1/2011 |
|---|---|---|
| KR | 20130061058 | 6/2013 |

OTHER PUBLICATIONS

PCT International Application No. PCT/KR2019/006188, International Search Report dated Feb. 21, 2020, 4 pages.

(Continued)

*Primary Examiner* — Toan H Vu
(74) *Attorney, Agent, or Firm* — LEE, HONG, DEGERMAN, KANG & WAIMEY

(57) ABSTRACT

Disclosed is a display device for more easily providing information on a character in a current scene to a user upon receiving a character search request. The display device includes a display configured to display an image, a wireless communication interface configured to receive character information of characters relating to the image, and a controller configured to control the display to display thumbnails of the characters based on the character information, wherein the controller controls the display to display an indicator on a thumbnail of a matching character most similar to a face image of a character in a current scene among the thumbnails of the characters.

15 Claims, 17 Drawing Sheets

(56) References Cited

U.S. PATENT DOCUMENTS

| | | | |
|---|---|---|---|
| 2005/0210414 A1* | 9/2005 | Angiulo | G06F 16/958 |
| | | | 707/E17.116 |
| 2008/0080743 A1 | 4/2008 | Schneiderman et al. | |
| 2010/0023507 A1* | 1/2010 | Kim | G06F 16/5838 |
| | | | 707/E17.03 |
| 2010/0104145 A1 | 4/2010 | Momosaki | |
| 2012/0106806 A1 | 5/2012 | Folta et al. | |
| 2012/0213490 A1 | 8/2012 | Steiner | |
| 2014/0040828 A1* | 2/2014 | Choi | G06F 3/04883 |
| | | | 715/835 |
| 2014/0195921 A1* | 7/2014 | Grosz | G06Q 30/0631 |
| | | | 715/738 |
| 2014/0321696 A1* | 10/2014 | Farid | G06T 7/0002 |
| | | | 382/100 |
| 2015/0149428 A1* | 5/2015 | Smith | G06F 16/9032 |
| | | | 707/706 |
| 2015/0356356 A1* | 12/2015 | Han | G06V 20/47 |
| | | | 386/241 |
| 2016/0055379 A1* | 2/2016 | Svendsen | G06F 16/50 |
| | | | 382/224 |
| 2016/0063104 A1 | 3/2016 | Barsook et al. | |
| 2016/0140108 A1 | 5/2016 | Lee | |
| 2016/0358015 A1 | 12/2016 | Dhua et al. | |
| 2019/0108419 A1* | 4/2019 | Coven | G06F 8/60 |
| 2021/0271855 A1* | 9/2021 | Kamio | H04N 7/183 |
| 2021/0289264 A1* | 9/2021 | Booth | G06F 16/735 |

OTHER PUBLICATIONS

European Patent Office Application Serial No. 19930003.9, Partial Search Report dated Dec. 15, 2022, 13 pages.

European Patent Office Application Serial No. 19930003.9, Search Report dated Feb. 2, 2023, 12 pages.

\* cited by examiner

FIG. 8
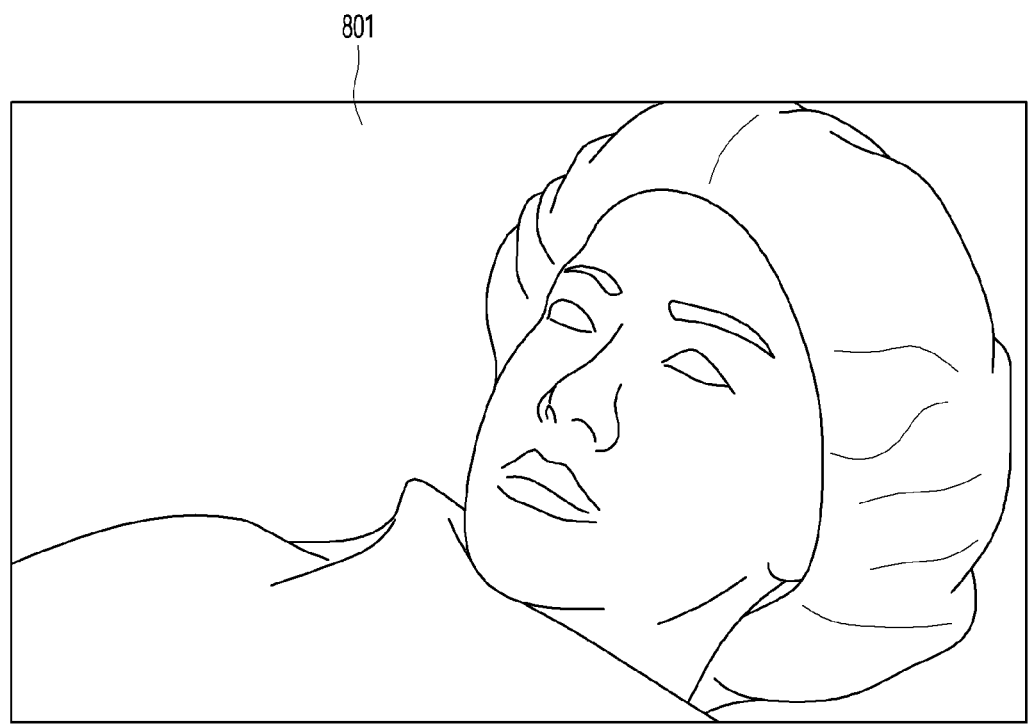
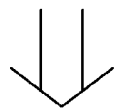

DISPLAY DEVICE

CROSS-REFERENCE TO RELATED APPLICATIONS

This application is the National Stage filing under 35 U.S.C. 371 of International Application No. PCT/KR2019/006188, filed on May 23, 2019, the contents of which is hereby incorporated by reference herein in its entirety.

TECHNICAL FIELD

The present disclosure relates to a display device, and more particularly to a display device for providing a function for searching for a character of an image.

BACKGROUND ART

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

A digital TV may also provide character information in an image that a user is viewing. In this case, since the digital TV lists and displays characters in a simple way, the user has inconvenience of having to compare the listed characters one by one with the currently displayed character in order to find the character in a current scene.

Accordingly, when the user requests a character search while viewing an image, a function of not only guiding the character in the image but also intuitively guiding the character in the current scene is required.

DISCLOSURE

Technical Problem

The present disclosure provides a display device for easily providing information on a character in a current scene to a user when receiving a request for a character search.

The present disclosure provides a display device for more rapidly guiding a changed character when the character in the current scene is changed as the scene is changed.

Technical Solution

A display device according to an embodiment of present disclosure comprises a display configured to display an image, a wireless communication interface configured to receive character information of characters relating to the image, and a controller configured to control the display to display thumbnails of the characters based on the character information, wherein the controller controls the display to display an indicator on a thumbnail of a matching character most similar to a face image of a character in a current scene among the thumbnails of the characters.

The controller detects whether a scene is changed, and when the scene is not changed, the controller maintains the indicator.

The controller detects whether a scene is changed, determines whether a first face of a character in a changed scene is the same as a second face of a face image that is acquired before when the scene is changed, and maintains the indicator when the first face and the second face are the same.

When the first face and the second face are not the same, the controller changes a position at which the indicator is displayed to a thumbnail corresponding to the second face.

When the indicator is changed, the controller acquires a thumbnail having a face most similar to the second face among the thumbnails of the characters.

The display device further comprising a user input interface configured to receive a character search command, upon receiving the character search command, the controller acquires content information relating to the image from an electronic program guide (EPG) and acquires the character information of the characters in the image on a web based on the content information.

The controller acquires a face image of each of the characters from the thumbnails of the characters and acquires the matching character by comparing the face image of each of the characters with the face image of the character in the current scene.

The controller acquires a matching image having a face most similar to the face image of the character in the current scene on a web and acquires the matching character based on the matching image.

The controller acquires names of the characters in the character information, acquires a matching image having a face most similar to the face image of the character in the current scene among images of the characters having the names on a web, and acquires the matching character based on the matching image.

The controller calculates a data value indicating similarity between each of the characters and the character in the current scene and recognizes a character having a largest data value as the matching character.

When a data value of the character having the largest data value is less than a preset reference value, the controller controls the display not to display the indicator.

When a data value of the character having the largest data value is equal to or greater than a preset reference value, the controller controls the display to display the indicator on a thumbnail corresponding to the matching character.

The display displays the thumbnail of the matching character most similar to the face image of the character in the current scene among the thumbnails of the characters differently from a thumbnail of a remaining character except for the matching character.

The display displays the thumbnail of the matching character lighter than the thumbnail of the remaining character.

When a plurality of characters is contained in the current scene, the controller controls the display to display a plurality of indicators on respective thumbnails corresponding to the plurality of characters among the thumbnails of the characters.

Advantageous Effects

According to an embodiment of the present disclosure, when information on a character is displayed on an image, an indicator may also be displayed on information on a character estimated as a character in a current scene, and thus recognition efficiency of a character that a user is curious about may be advantageously increased. That is, an effort of the user to find a character in the current scene among the characters may be minimized, thereby advantageously providing user convenience.

According to an embodiment of the present disclosure, when scene change is detected, a face in a changed scene may be compared with a face in a previous scene to determine whether the position of an indicator is changed, and thus a number of time that a face comparison algorithm is performed may be minimized, thereby increasing an image processing speed.

According to an embodiment of the present disclosure, when a character in the current scene is changed along with scene change, an indicator for emphasizing the changed character may be changed, thereby advantageously improving the reliability of a character guidance function.

According to an embodiment of the present disclosure, a face in the current scene may be compared with faces in thumbnails, and thus a speed for acquiring a matching character may be higher than in the case in which the face in the current scene is compared with arbitrary faces, thereby advantageously increasing accuracy.

DESCRIPTION OF DRAWINGS

FIG. 8 is a diagram showing an example of a method of acquiring a face image of a character in a current scene by a display device according to an embodiment of the present disclosure.

BEST MODE

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
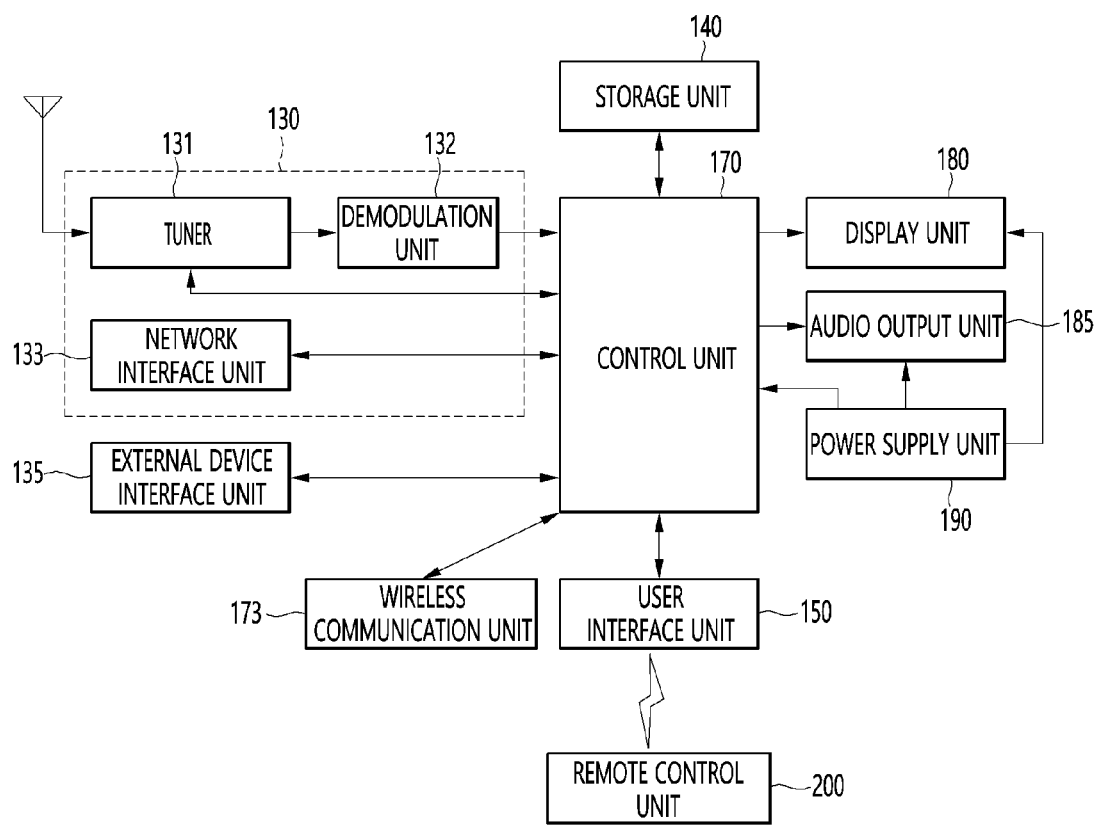
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
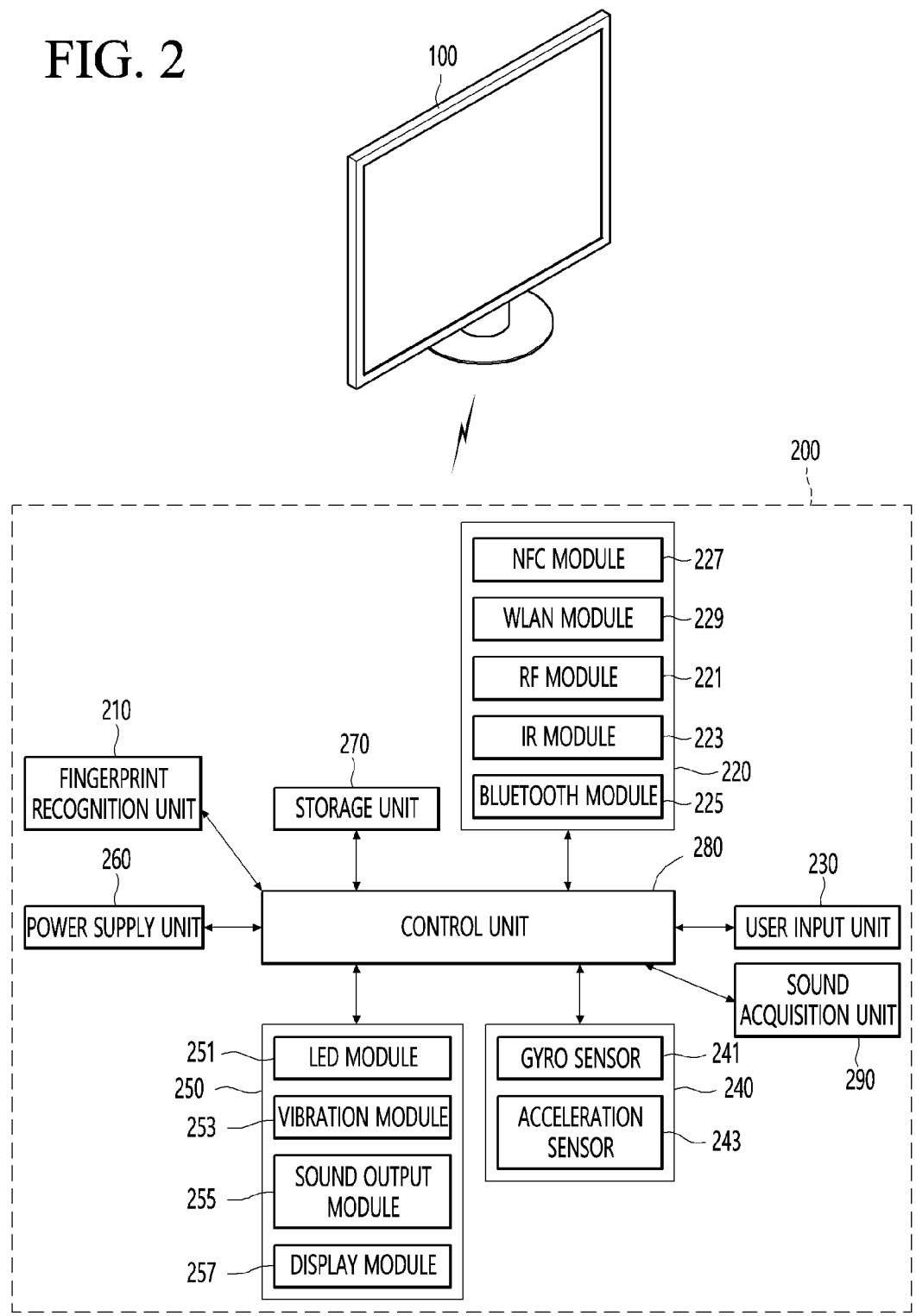
FIG. 2 is a block diagram illustrating a remote control device according to an embodiment of the present disclosure.
Figure 3:
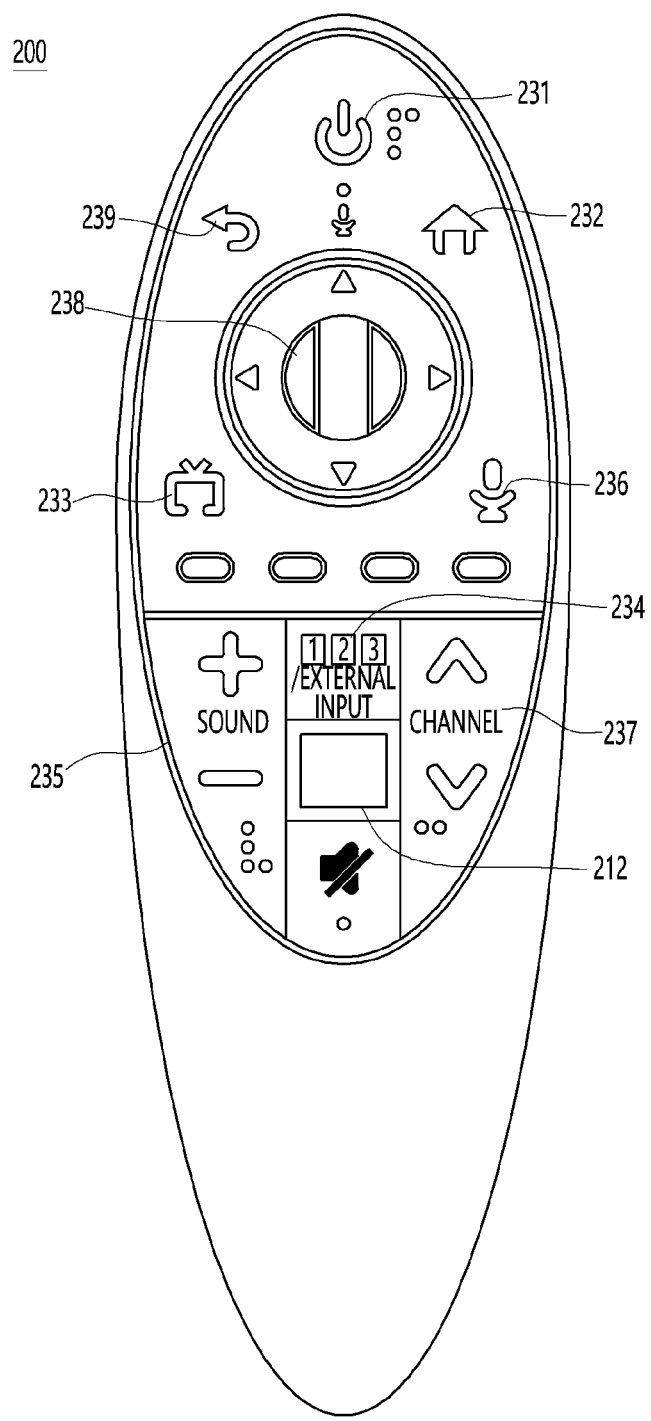
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
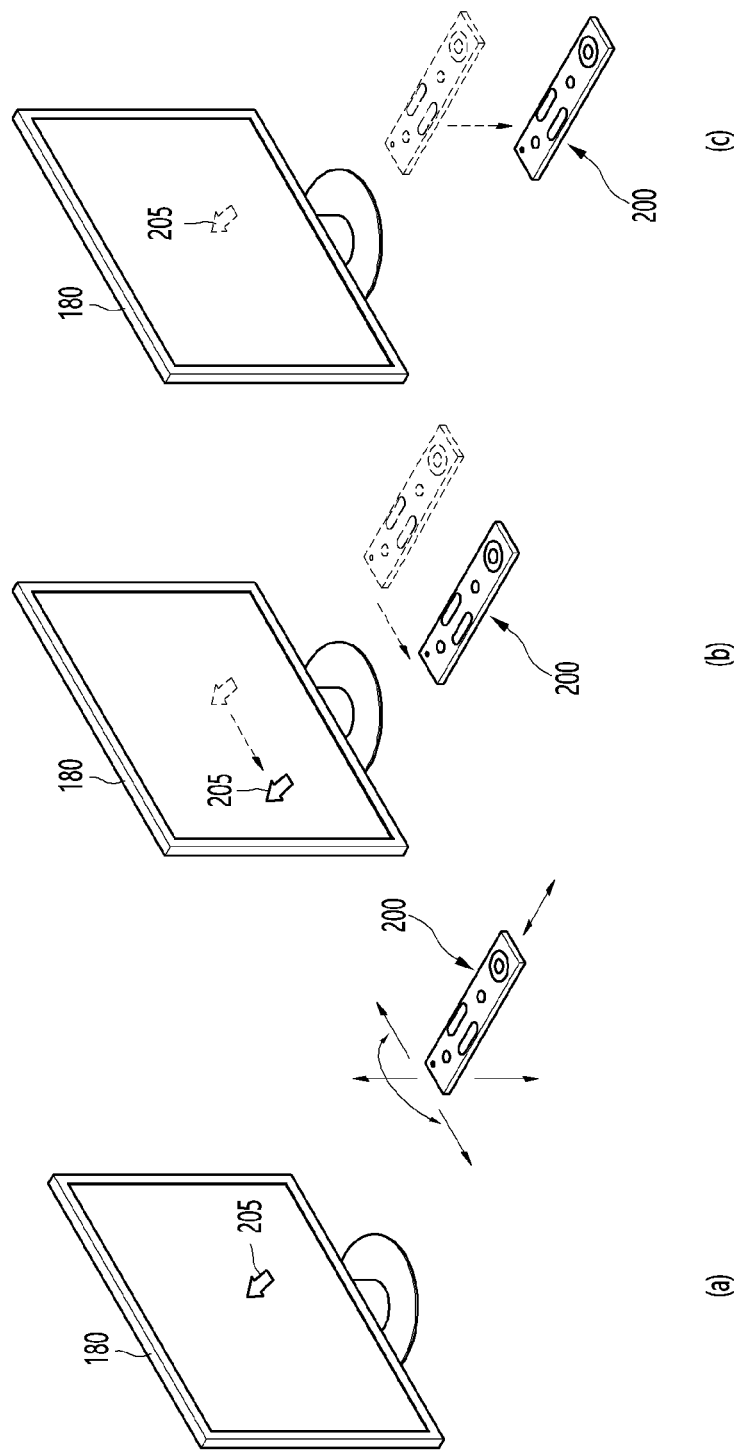
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
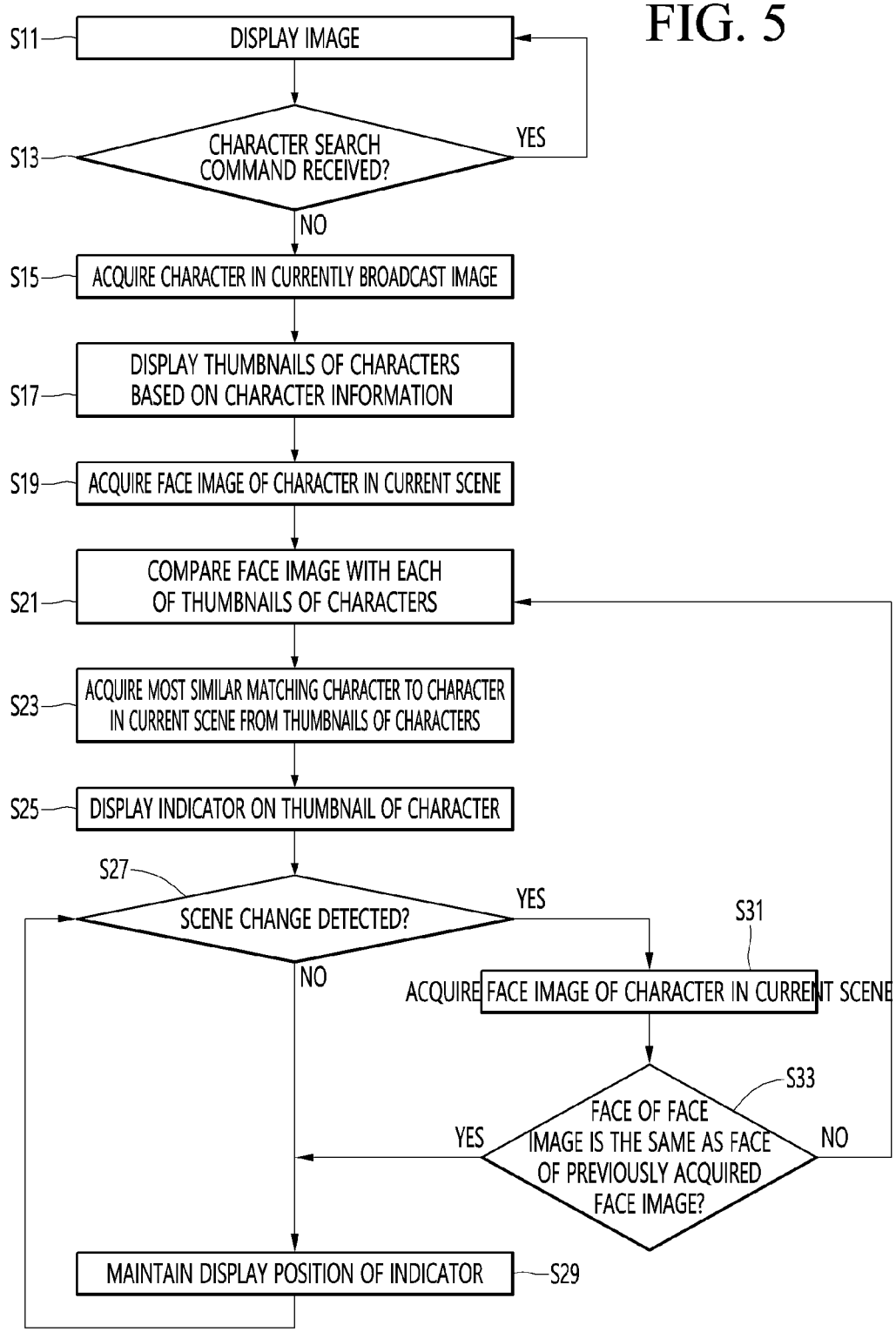
FIG. 5 is a flowchart showing an operating method of a display device according to an embodiment of the present disclosure.

FIG. 5 is a flowchart showing an operating method of a display device according to an embodiment of the present disclosure.

The display 180 may display an image (S11).

The image may be a TV program broadcast image received through the broadcast reception module 130.

The controller 170 may control the display 180 the TV program broadcast image received through the broadcast reception module 130.

The controller 170 may determine whether a character search command is received (S13).

The character search command may be a command to request information on a character in the image displayed by the display 180.

A user may make a request for a character search to the display device 100 when the user is curious about the character in the image while watching the image.

The user may select at least one button included in the remote control device 200 to request a character search. The controller 170 may receive the character search command from the remote control device 200 through the user input interface 150.

Figure 6:
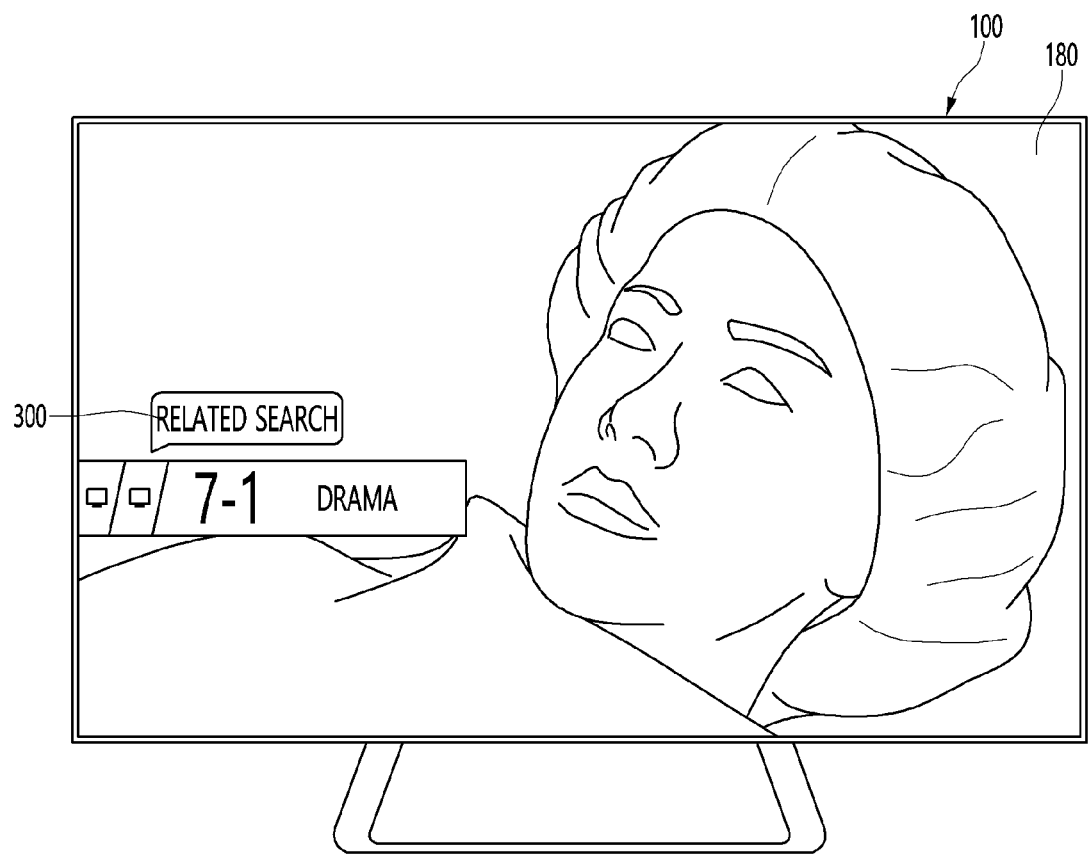
FIG. 6 is a diagram showing an example of a method of receiving a character search command by a display device according to an embodiment of the present disclosure.

FIG. 6 is a diagram showing an example of a method of receiving a character search command by a display device according to an embodiment of the present disclosure.

The display 180 may display a search icon 300. The search icon 300 may be an icon for searching for information relating to the image displayed by the display 180.

The user may select the search icon 300 with a pointer (not shown) using the remote control device 200. The controller 170 may receive a selection command of the search icon 300 through the user input interface 150 to recognize reception of a character search command.

However, the aforementioned method is merely exemplary, and the controller 170 may receive the character search command using various methods.

In another example, the user may request a character search through voice utterance. The controller 170 may receive the character search command through the voice acquisition module 175 of the display device 100 or the microphone 291 of the remote control device 200.

Again, FIG. 5 is described.

When the controller 170 does not receive the character search command, the controller 170 may continuously display an image that is currently displayed.

When receiving the character search command, the controller 170 may acquire character information in a currently broadcast image (S15).

When receiving the character search command, the controller 170 may acquire content information relating to an image from electronic program guide (EPG) and may acquire character information of a character in the image on a web based on the content information.

In detail, when receiving the character search command, the controller 170 may acquire content information relating to the image from the EPG to identify a current image. That is, the controller 170 may acquire a current channel, a current time, etc. at a time of receiving the character search command and may acquire content information corresponding to a current channel and a current time from the EPG.

Content information may include information relating to an image, such as a program name or a program manufacturer. For example, when receiving the character search command, the controller 170 may acquire a program name of an image from the EPG.

The controller 170 may search for a character of the program name on a web based on the program name, and thus may acquire character information of the character of the image. That is, the controller 170 may acquire the character information of the character of the image through the wireless communication interface 173.

The character information may include a name, an image, or the like of the character.

The controller 170 may display a thumbnail of the character based on the character information (S17).

The controller 170 may display the thumbnail including the character and a face image.

Figure 7:
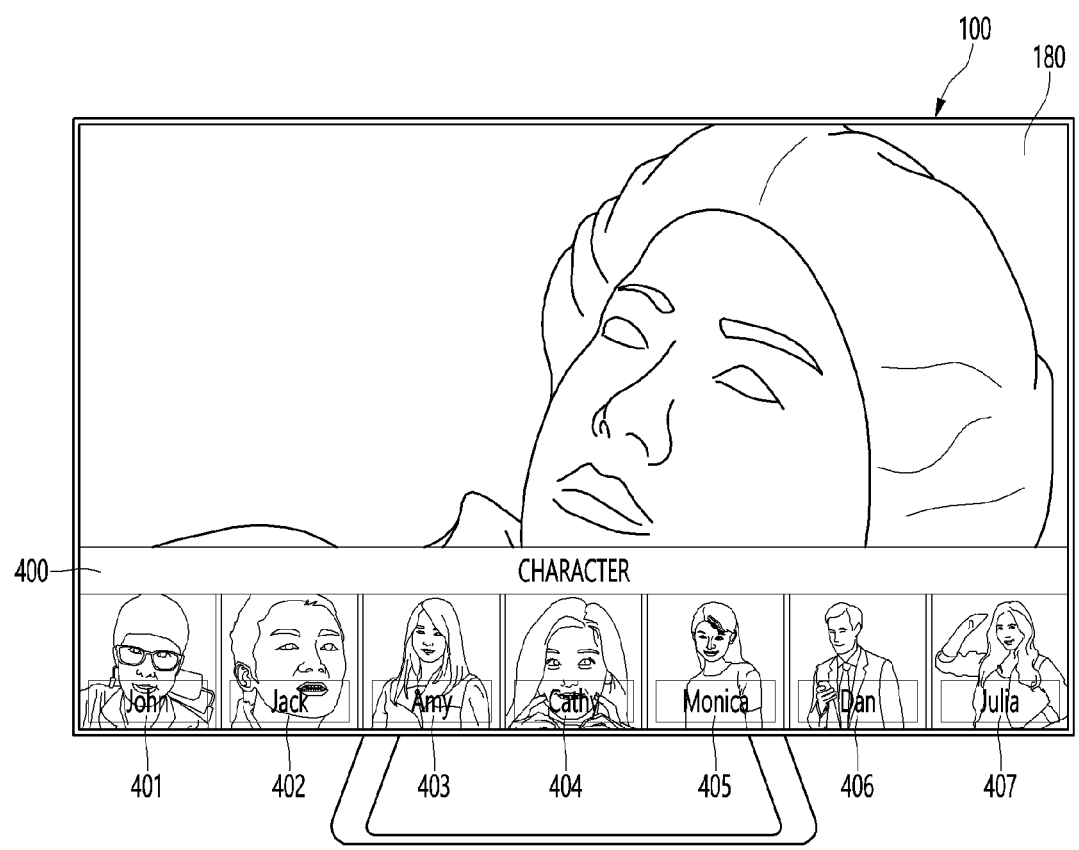
FIG. 7 is a diagram showing an example of a method of displaying a thumbnail of a character by a display device according to an embodiment of the present disclosure.

FIG. 7 is a diagram showing an example of a method of displaying a thumbnail of a character by a display device according to an embodiment of the present disclosure.

When receiving a character search command, the controller 170 may display character search information 400 that thumbnails 401 to 407 of characters, as shown in FIG. 7.

The thumbnails 401 to 407 of characters may be images included in the character information. In some embodiments, the thumbnails 401 to 407 of characters may include names of the character.

However, FIG. 7 is merely exemplary for convenience of description, and thus the present disclosure is not limited thereto.

Again, FIG. 5 is described.

The controller 170 may acquire a face image of a character in a current scene (S19).

The controller 170 may acquire the current scene of a current image displayed by the display 180 and may acquire the face image of the character included in the current scene.

The current image may refer to a TV broadcast program image. That is, the current image may refer to only a TV broadcast program image before the character search information 400 is displayed when the display 180 displays the character search information 400 on the TV broadcast program image.

The current scene may be an image scene at a time at which a character search command is received or an image scene at a time at which a scene change is detected.

Next, FIG. 8 is a diagram showing an example of a method of acquiring a face image of a character in a current scene by a display device according to an embodiment of the present disclosure.

The controller 170 may acquire the current scene of the current image displayed by the display 180. For example, as shown in FIG. 7, when the display 180 displays an image and the character search information 400, the controller 170 may acquire a current scene 801 that is a scene of an image itself except for the character search information 400, and the current scene 801 may be an image shown in an upper portion of FIG. 8.

The controller 170 may acquire the current scene 801 and may then acquire a face image 811 of a character in the current scene.

According to an embodiment, the controller 170 may acquire the face image 811 of the character through a face detection algorithm from a current scene 810, and the face image 811 may be an image shown in a lower part of FIG. 8. The controller 170 may recognize the eye, the nose, the mouse, etc. from the current scene 810 to acquire a face region of the character and may acquire the face image 811 including the face region.

Again, FIG. 5 is described.

The controller 170 may compare the face image with each of the thumbnails of the characters (S21).

The controller 170 may compare the face image 811 with each of the thumbnails of the characters to search for the same character as the character in the current scene among characters. To this end, the controller 170 may acquire a face of a character from each of the thumbnails 401 to 407 of the characters.

Figure 9:
FIG. 9 is a diagram showing an example of a method of acquiring a face image of a character by a display device according to an embodiment of the present disclosure.

FIG. 9 is a diagram showing an example of a method of acquiring a face image of a character by a display device according to an embodiment of the present disclosure.

The controller 170 may apply a face detection algorithm to each of the thumbnails 401 to 407 of the characters to acquire a face image of each of the characters.

Left images 901 to 907 of FIG. 9 may indicate the thumbnails 401 to 407 of characters, respectively. The left images 901 to 907 of FIG. 9 may be character images included in the character information.

Right images 911 to 917 of FIG. 9 may be face images acquired from the thumbnails 401 to 407 of the characters, respectively. Similarly, the controller 170 may acquire the face images 901 to 907 of characters from the thumbnails 401 to 407 of the characters through a face detection algorithm. That is, the controller 170 may recognize the eye, the nose, the mouse, etc. from each of the thumbnails 401 to 407 of the characters to acquire a face region of the character and may acquire the face images 901 to 907 including the face region.

The controller 170 may compare the face image 811 of the character in the current scene 801 with each of the face images 911 to 917 of the characters.

Again, FIG. 5 is described.

The controller 170 may acquire the most similar matching character to the character in the current scene from the thumbnails of the characters (S23).

The controller 170 may compare the face image 811 of the character in the current scene 801 with each of the face images 911 to 917 of the characters to acquire a matching character.

The matching character may refer to a character that matches the character in the current scene among characters. The matching character may be changed depending on a scene.

The controller 170 may calculate similarity between the face image 811 of a character in the current scene 801 and each of the face images 911 to 917 of the characters, and may acquire the matching character.

There may be various methods of calculating similarity of characters.

Figure 10:
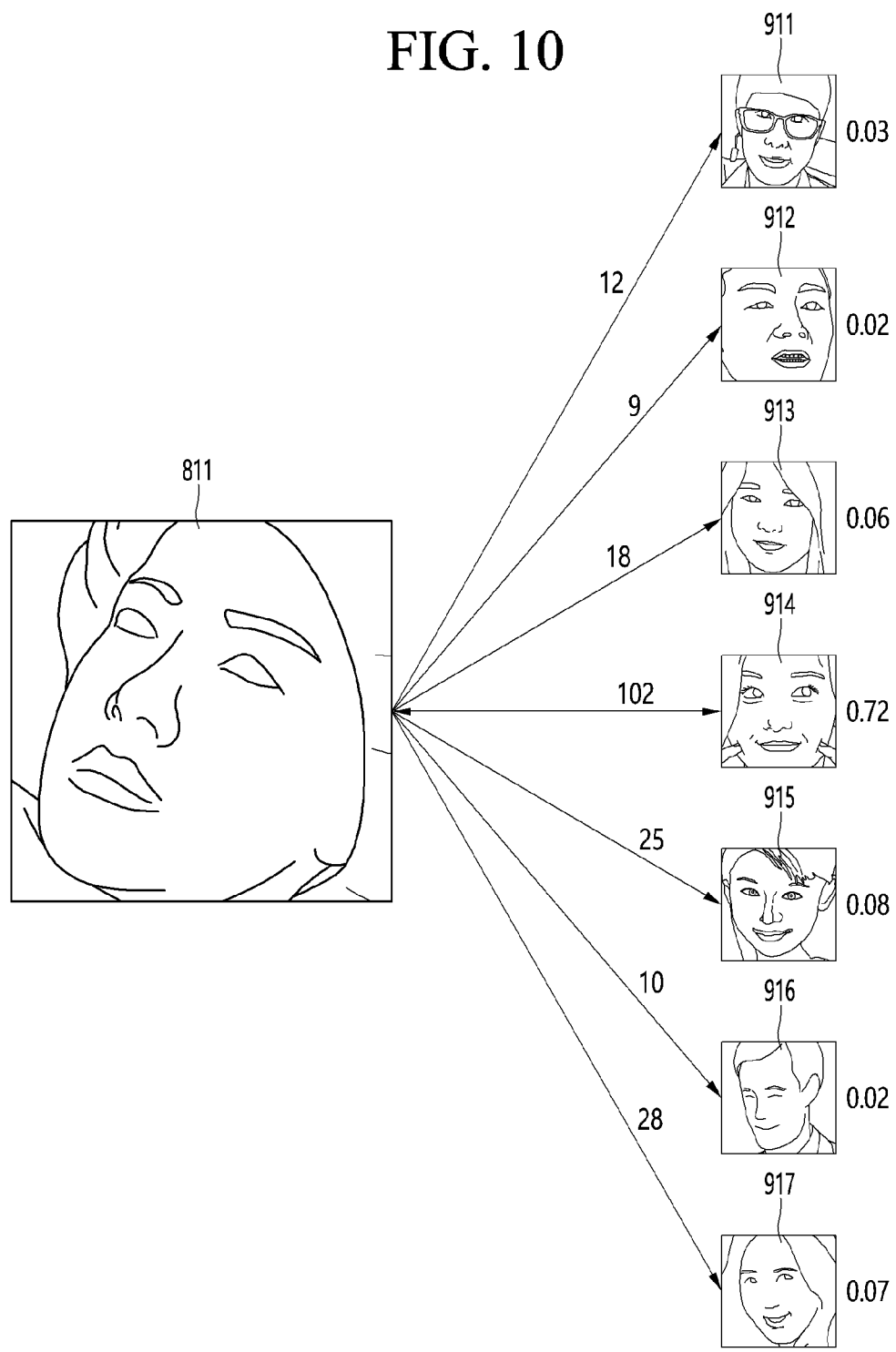
FIG. 10 is a diagram showing an example in which a display device calculates similarity between a face image in a current scene and a face image of a character according to an embodiment of the present disclosure.

FIG. 10 is a diagram showing an example in which a display device calculates similarity between a face image in a current scene and a face image of a character according to an embodiment of the present disclosure.

The controller 170 may calculate similarity between each of the face images 911 to 917 of the characters and the face image 811 in the current scene through a face recognition algorithm. The controller 170 may analyze facial features such as symmetrical composition and shape of the face, hair, eye color, and facial muscle movement and may calculate similarity between each of characters and the face image 811 in the current scene.

The controller 170 may calculate the similarity to be higher as the facial features are more similar.

For example, the controller 170 may calculate similarity between the face image 811 in the current scene and a first character face image 911 as 12, may calculate similarity between the face image 811 in the current scene and a second character face image 912 as 9, may calculate similarity between the face image 811 in the current scene and a third character face image 913 as 18, may calculate similarity between the face image 811 in the current scene and a fourth character face image 914 as 102, may calculate similarity between the face image 811 in the current scene and a fifth character face image 915 as 25, may calculate similarity between the face image 811 in the current scene and a sixth character face image 916 as 10, and may calculate similarity between the face image 811 in the current scene and a seventh character face image 917 as 28.

According to an embodiment, the controller 170 may recognize a character corresponding to a character face image having a similarity with the face image 811 in the current scene, which is calculated to be highest. In an example of FIG. 10, the controller 170 may recognize a fourth character as a matching character.

According to another embodiment, the controller 170 may calculate similarity to implement a probability model and may recognize a character corresponding to a character face image having the greatest data value as a matching character according to implementation of the probability model. In an example of FIG. 10, the controller 170 may implement the probability model, and may then calculate a data value of the first character face image 911 as 0.03, may calculate a data value of the second character face image 912 as 0.02, may calculate a data value of the third character face image 913 as 0.06, may calculate a data value of the fourth character face image 914 as 0.72, may calculate a data value of the fifth character face image 915 as 0.08, may calculate a data value of the sixth character face image 916 as 0.02, and may calculate a data value of the seventh character face image 917 as 0.07. Accordingly, in this case, the controller 170 may recognize a fourth character as the matching character.

Again, FIG. 5 is described.

The controller 170 may display an indicator on a thumbnail corresponding to the matching character (S25).

Upon acquiring the matching character, the controller 170 may indicator on the thumbnail corresponding to the matching character.

Here, the indicator may distinguish the matching character from the remaining characters.

The controller 170 may control the display 180 to display the indicator for distinguishing the matching character from the remaining characters in the thumbnails 401 to 407 of the characters included in the character search information 400.

Figure 11:
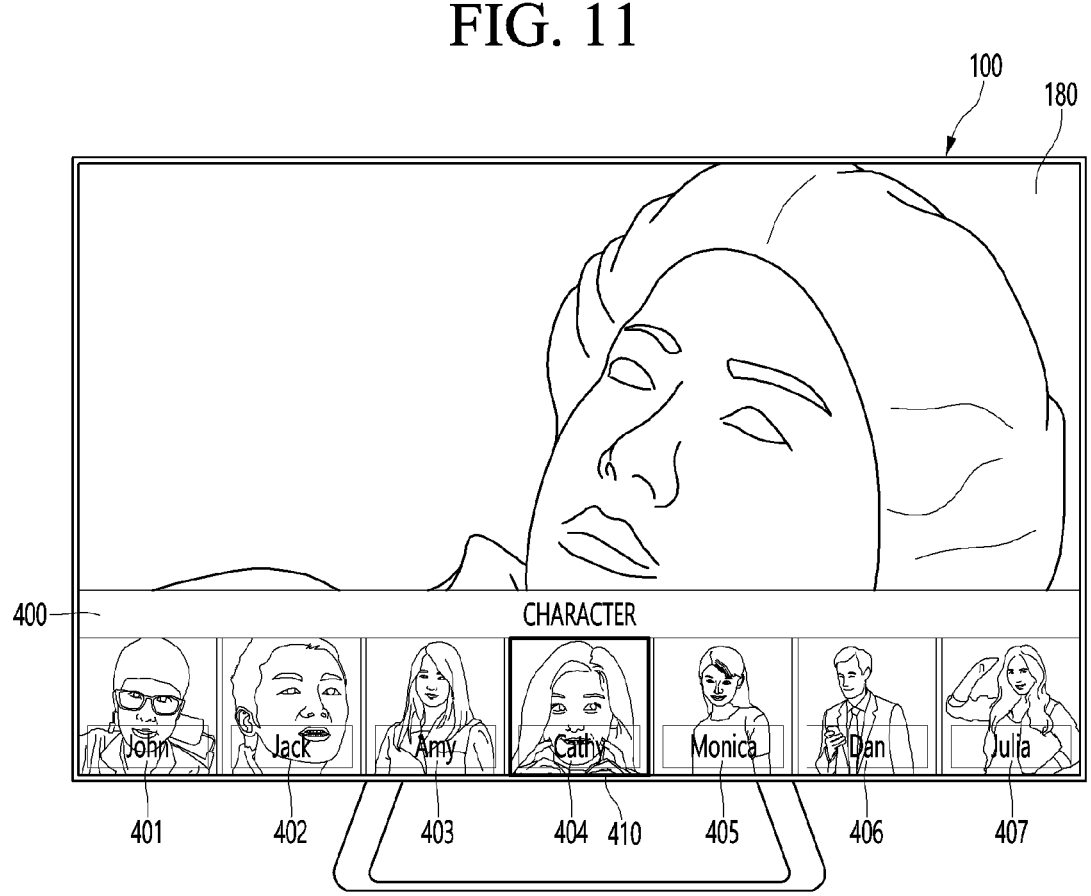
FIG. 11 is a diagram showing an example of a method of displaying an indicator by a display device according to an embodiment of the present disclosure.

Next, FIG. 11 is a diagram showing an example of a method of displaying an indicator by a display device according to an embodiment of the present disclosure.

According to an embodiment of the present disclosure, as shown in FIG. 11, an indicator 410 may be a highlight box for emphasizing the matching character.

The controller 170 may display a highlight box on a thumbnail 404 of a character corresponding to the matching character among the thumbnails 401 to 407 of the characters. In this case, the controller 170 may not display a highlight box on the thumbnails 401 to 403 and 405 to 407 of the remaining characters except for the matching character.

The controller 170 may also display the matching character to be distinguished from the remaining characters using a different method instead of an indicator.

Figure 12:
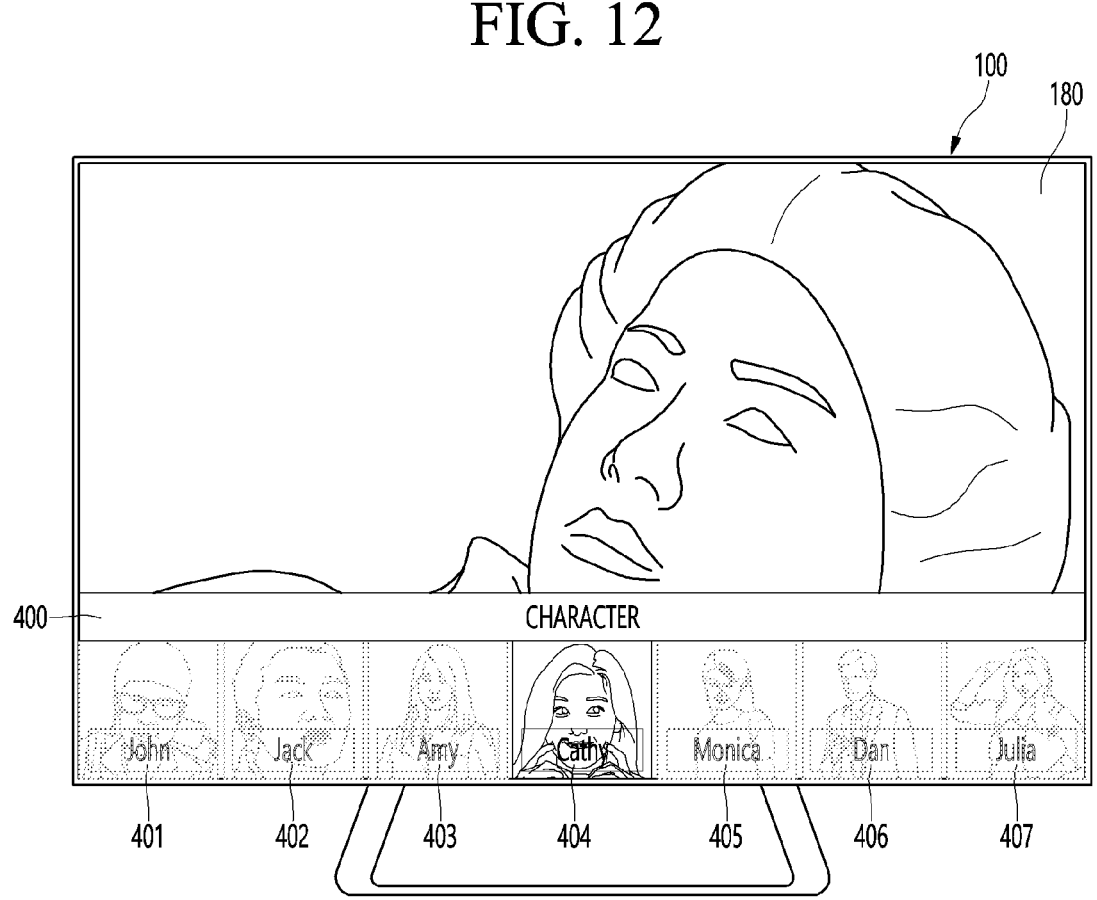
FIG. 12 is a diagram showing an example of a method of indicating a matching character by a display device according to another embodiment of the present disclosure.

FIG. 12 is a diagram showing an example of a method of indicating a matching character by a display device according to another embodiment of the present disclosure.

As shown in FIG. 12, the controller 170 may control the display 180 to display the thumbnail 404 corresponding to the matching character to be lighter than the thumbnails 401 to 403 and 405 to 407 of other characters.

However, FIGS. 11 and 12 are merely examples for convenience of description, and the controller 170 may display the matching character in character search information using various methods of distinguishing the matching character from other characters.

Again, FIG. 5 is described.

The controller 170 may display an indicator and may then acquire information on whether a scene is changed (S27).

When no scene change is detected, the controller 170 may maintain the position at which the indicator is displayed (S29).

For example, as shown in FIG. 11, when no scene change is detected in the state in which the indicator 410 is displayed, the controller 170 may continuously display the indicator 410 on the thumbnail 404 corresponding to a fourth character. As shown in FIG. 12, when no scene change is detected in the state in which the thumbnail 404 corresponding to the fourth character is displayed to be lighter than the thumbnails 401 to 403 and 405 to 407 of the other characters, the controller 170 may control the display 180 to continuously display the thumbnail 404 corresponding to the fourth character to be lighter than the thumbnails 401 to 403 and 405 to 407 of the other characters.

In operation S27, when detecting scene change, the controller 170 may acquire a face image in a character in the current scene (S31).

That is, when the scene is changed, the controller 170 may acquire the face image of the character in the changed scene.

Figure 13:
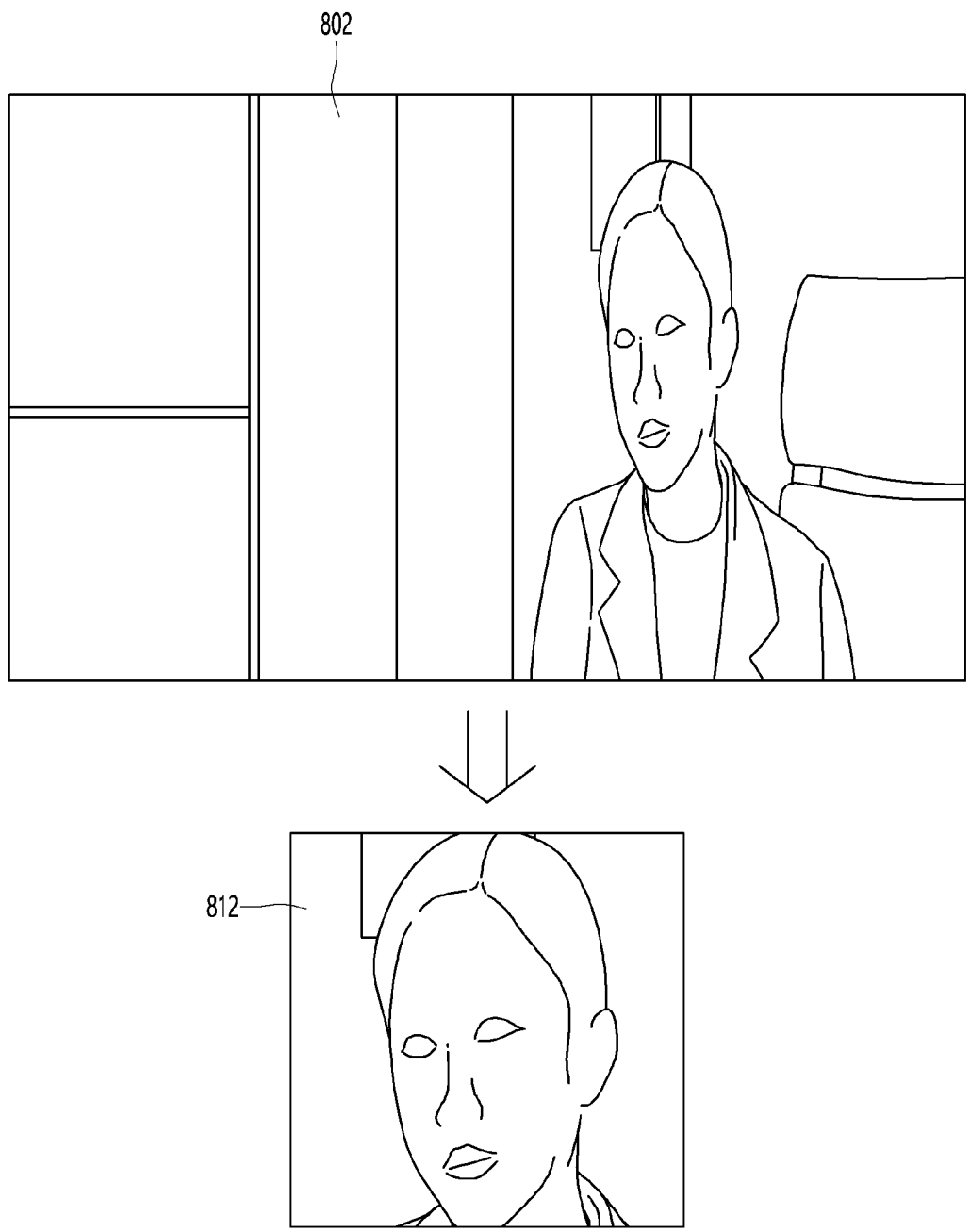
FIG. 13 is a diagram showing a method of acquiring a face image of a character in a changed scene by a display device according to an embodiment of the present disclosure.

FIG. 13 is a diagram showing a method of acquiring a face image of a character in a changed scene by a display device according to an embodiment of the present disclosure.

When detecting scene change, the controller 170 may acquire a changed scene 802, and the changed scene 802 may be shown in an upper part of FIG. 13.

The changed scene 802 may refer to a current scene of an image after a scene is changed. Thus, the changed scene 802 may be different from the current scene 801 in operation S19.

The controller 170 may acquire a face image 812 from the changed scene 802, and the face image 812 may be shown in a lower part of FIG. 13.

A method of acquiring a current scene and a face image from the current scene is the same as the description given with reference to FIG. 8, and thus a redundant description will be omitted.

Again, FIG. 5 is described.

The controller 170 may acquire information on whether a face of the face image acquired from in a changed scene is the same as a face of a previously acquired face image (S33).

Figure 14:
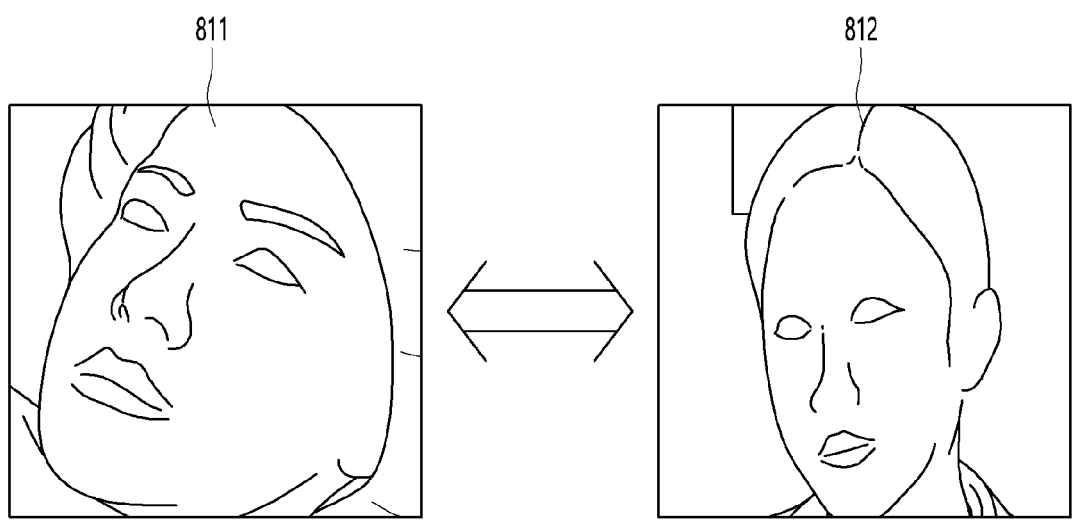
FIG. 14 is a diagram showing a method of determining whether faces are the same by a display device when a scene of an image is changed according to an embodiment of the present disclosure.

FIG. 14 is a diagram showing a method of determining whether faces are the same by a display device when a scene of an image is changed according to an embodiment of the present disclosure.

The controller 170 may determine whether a face of the face image 812 acquired from the changed scene 802 is the same as a face of the face image 811 acquired from a previous scene.

According to an embodiment, the controller 170 may compare the face image 812 acquired from the changed scene 802 with the face image 811 acquired from the previous scene 801 to determine whether the faces are the same.

There may be various methods of determining whether the faces are the same. For example, the controller 170 may calculate similarity using the aforementioned method of calculating similarity, when the similarity is equal to or greater than a setting value, the controller 170 may determine that a face in the changed scene 802 is the same as a face in the previous scene 801, and when the similarity is less than the setting value, the controller 170 may determine that the face in the changed scene 802 is different from the face in the previous scene 801.

Again, FIG. 5 is described.

When the face of the face image acquired from the changed scene is the same as the face of the previously acquired face image, the controller 170 may maintain the position of the indicator.

That is, when determining that a character in the changed scene is the same as a character in a previous scene, the controller 170 may maintain the matching character, and thus may control the display 180 to continuously display the indicator on the same thumbnail. For example, the controller 170 may detect whether a scene is changed, may determine whether a first face of a character in a changed scene is the same as a second face of a previously acquired face image when the scene is changed, and may maintain the indicator 410 when the first face and the second face are the same.

When the face of the face image acquired from the changed scene is not the same as the face of the previously acquired face image, the controller 170 may change the position at which the indicator is displayed. For example, when the first face and the second face are not the same, the controller 170 may change the position at which the indicator 410 is displayed. When the indicator 410 is changed, the controller 170 may acquire the most similar face to the face in the changed scene among thumbnails of characters, and the most similar acquired face may be the second face. In this case, the controller 170 may change the position at which the indicator 410 is displayed to a thumbnail corresponding to the second face from a thumbnail corresponding to the first face.

In detail, when the face of the face image acquired from the changed scene is not the same as the face of the previously acquired face image, the controller 170 may re-perform operations S21, S23, and S25. In particular, the controller 170 may compare the face image acquired from the changed scene with each of the thumbnails of the characters to re-acquire a matching character and may display an indicator on a thumbnail corresponding to the re-acquired matching character.

When the re-acquired matching character is different from the previously acquired matching character, the controller 170 may display an indicator on a thumbnail of a matching character changed from the thumbnail of the previous matching character.

Figure 15:
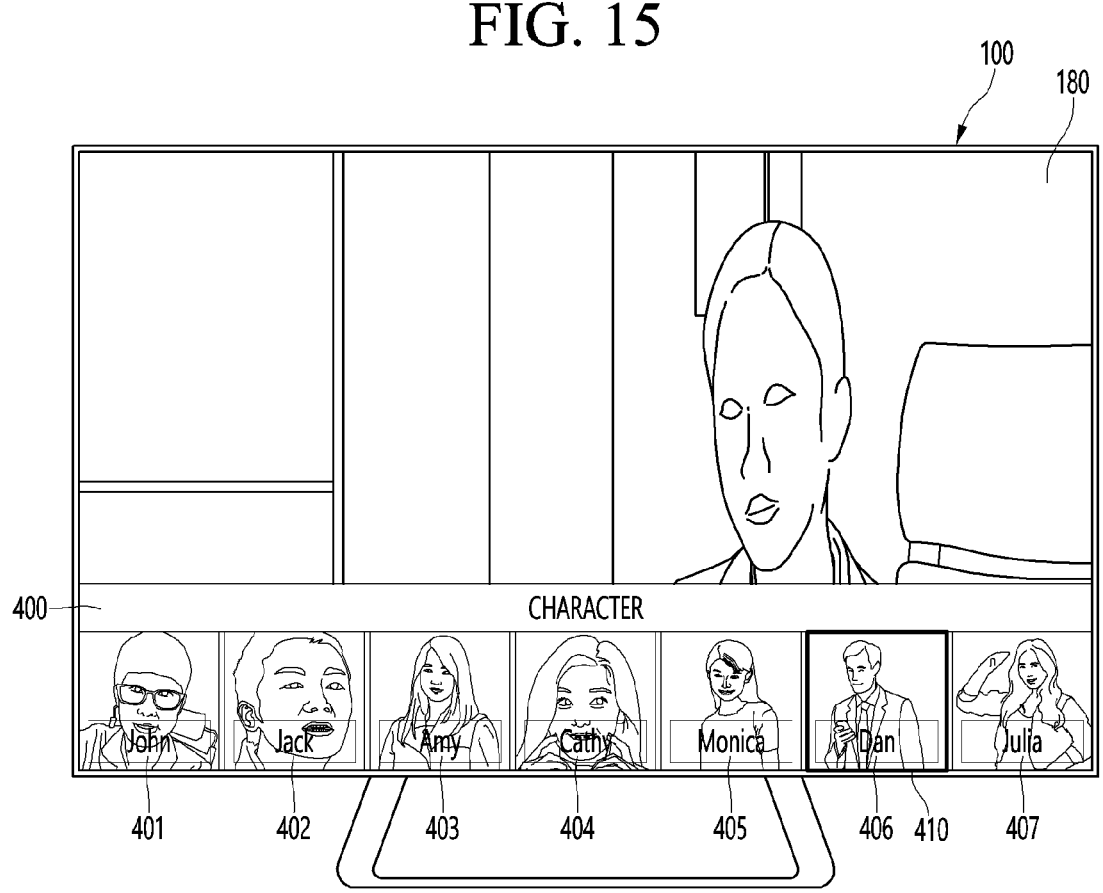
FIG. 15 is a diagram for explaining a method of changing a display position of an indicator by a display device according to an embodiment of the present disclosure.

FIG. 15 is a diagram for explaining a method of changing a display position of an indicator by a display device according to an embodiment of the present disclosure.

For example, as shown in FIG. 11, the controller 170 may re-acquire a matching character as a sixth character from a fourth character in the state in which the indicator 410 is displayed on the thumbnail 404 corresponding to the fourth character. In this case, as shown in FIG. 15, the controller 170 may remove the indicator 410 from the thumbnail 404 corresponding to the fourth character and may display the indicator 410 on a thumbnail 406 corresponding to the sixth character. That is, the controller 170 may change the display position of the indicator 410 to the thumbnail 406 corresponding to the sixth character from the thumbnail 404 corresponding to the fourth character.

The controller 170 may detect scene change and may not acquire a face image of a character in operation S31. In this case, the controller 170 may exclude the display 180 not to display the indicator 410. That is, when there is no character in an image scene, the display device 100 may remove the indicator 410, thereby improving reliability.

The controller 170 may determine that the face of the previous scene is not the same as the face of in the current scene in operation S33, but may recognize the matching character as the same character as the result of operations S21 and S23. In this case, the controller 170 may maintain the display position of the indicator 410.

The controller 170 may also recognize a plurality of characters from the current scene. For example, as the result of operations S17 and S31, the controller 170 may acquire a plurality of face images of the plurality of characters, and in this case, the number of matching characters may be two or more. In this case, the controller 170 may control the display 180 to display a plurality of indicators on respective thumbnails corresponding to a plurality of characters among the thumbnails 401 to 407 of characters.

That is, the controller 170 may display indicators on all thumbnails corresponding to characters in the current scene.

In some embodiments, when a plurality of indicators is displayed, the controller 170 may control the display 180 to display the plurality of indicators with different colors. For example, when the matching characters are a first character, a second character, and a third character, the first and second characters are men and the third character is a woman based on character information, the controller 170 may control the display 180 to display an indicator with a first color on thumbnails of the first and second characters and to display an indicator with a second color on a thumbnail of the third character.

As such, the display device 100 according to an embodiment of the present disclosure may not only display a thumbnail of a character but also may display an indicator on a thumbnail corresponding to a character in the current scene, thereby advantageously providing convenience of quickly and intuitively recognizing a character that a user is curious about.

According to the present disclosure, user inconvenience of having to search for a character in the current scene while comparing all the characters displayed on the character search information 400 while viewing an image may be advantageously minimized.

In particular, inconvenience in which it is difficult for a user to find a character in the current scene when an image of a character included in the character search information 400 is not updated to the recent image may be advantageously minimized.

When a new face is searched for along with scene change in the state in which the character search information 400 is displayed, the display device 100 may change the display position of the indicator 410 to advantageously adapt to a change in real time.

Figure 16:
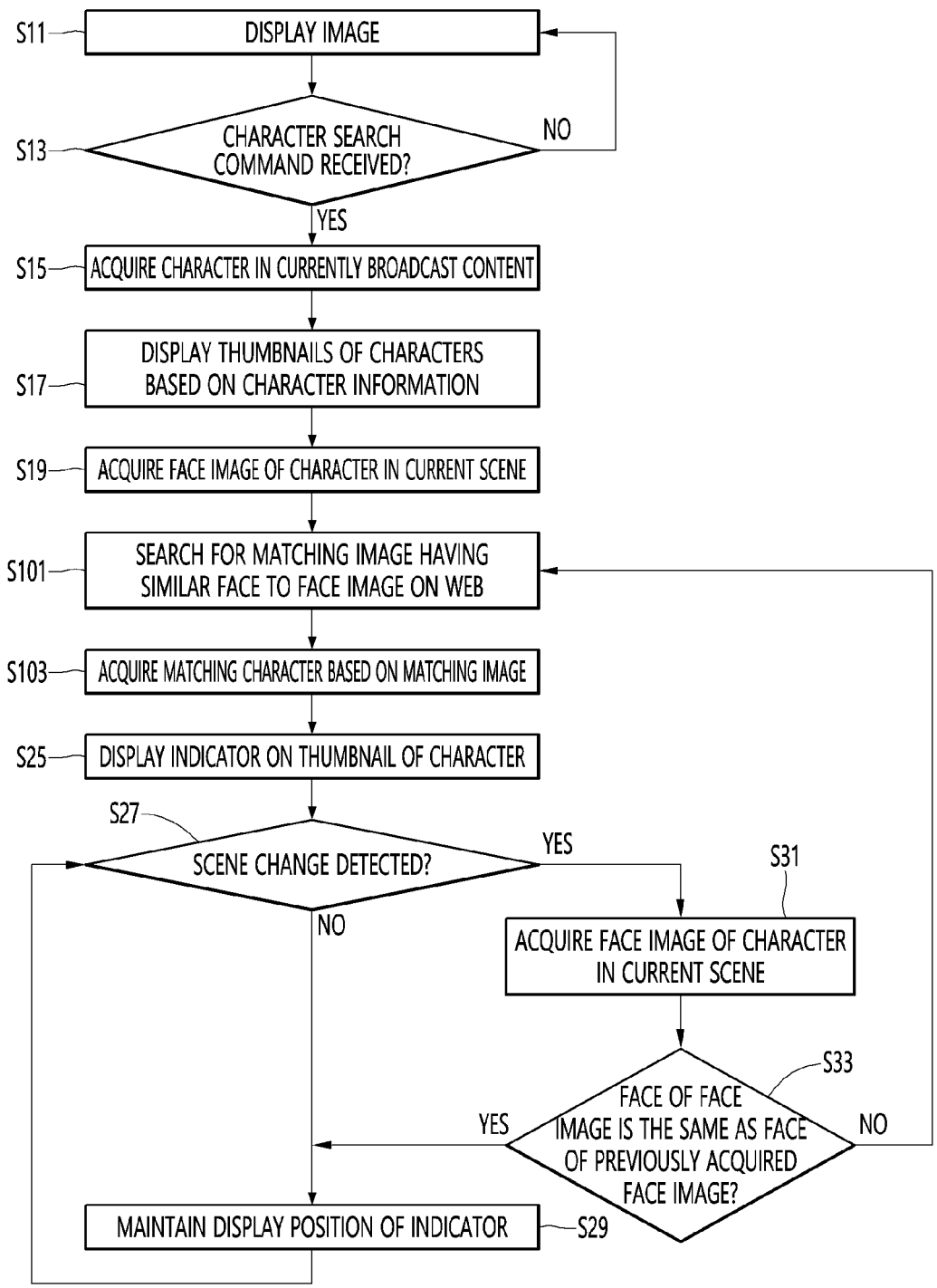
FIG. 16 is a flowchart showing an operating method of a display device according to another embodiment of the present disclosure.

FIG. 16 is a flowchart showing an operating method of a display device according to another embodiment of the present disclosure.

FIG. 16 is different from FIG. 5 in that operations S101 and S103 are performed instead of operations S21 and S23 shown in FIG. 5.

That is, according to an embodiment of the present disclosure, as shown in FIG. 5, the controller 170 may compare a face image in the current scene with each of the thumbnails of the characters, and thus may acquire the most similar matching character to the character in the current scene from the thumbnail of the character.

In contrast, according to another embodiment of the present disclosure, as shown in FIG. 16, the controller 170 may search for a matching image having a similar face to the face image in the current scene on a web and may acquire a matching character based on the matching image. The other operations except for operations S101 and S103 are the same as the description given with reference to FIG. 5, and thus a redundant description will be omitted.

As shown in FIG. 16, the controller 170 may acquire a face image of a character in the current scene and may then search for a matching image having a similar face to the face image on a web (S101).

That is, the controller 170 may search for the matching image having the similar face to the face image of the character in the current scene on a web.

In this case, in some embodiments, the controller 170 may limit a search range on a web to characters. In detail, the controller 170 may filter only the character information acquired in operation S15 from the character information searched on a web and may then acquire a matching image having a similar face to the face image of the character in the current scene based on the filtered character information. In this case, because the search range is reduced, a time taken to acquire the matching image may be advantageously minimized.

The web described as the search range in operation S101 is only given as an example for convenience of description and this may be may be changed. For example, the controller 170 may search for a matching image having a similar face to the face image of the character in the current scene from an external server, and in this case, the external server may include a database having character information.

The matching image may refer to an image having the same or similar face to a face of the face image acquired from the current scene.

The controller 170 may acquire the matching image and may acquire a matching character based on the matching image (S103).

According to an embodiment, the matching image may include metadata such as a name. The controller 170 may acquire the matching character by acquiring the character information in the matching image based on the metadata included in the matching image.

Figure 17:
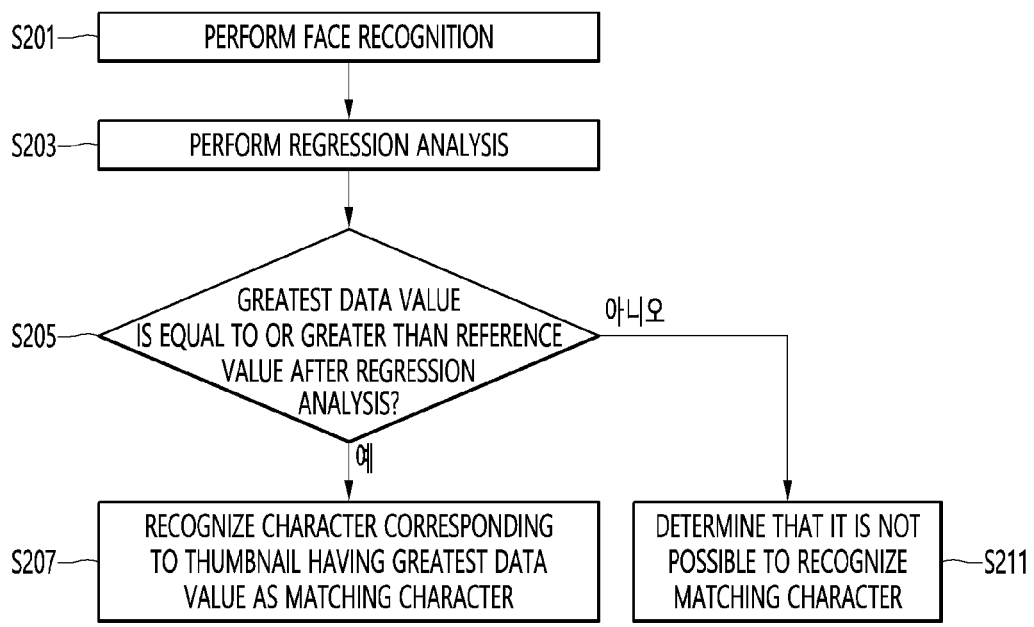
FIG. 17 is a flowchart showing a method of acquiring a matching character by a display device in detail according to an embodiment of the present disclosure.

Next, FIG. 17 is a flowchart showing a method of acquiring a matching character by a display device in detail according to an embodiment of the present disclosure.

The controller 170 may acquire a matching character in FIG. 5 or may operate according to the flowchart shown in FIG. 17 when acquiring the matching image in FIG. 16. Hereinafter, it may be assumed that the controller 170 acquires a matching character.

The controller 170 may perform face recognition (S201).

For example, the controller 170 may calculate similarity between each of the face images 911 to 917 of characters and the face image 811 in the current scene through face recognition for comparing facial features.

The controller 170 may perform face recognition and may then perform regression analysis (S203).

The controller 170 may perform regression analysis to implement the similarity calculated as the result of face recognition as a probability model. As the implementation result of the probability model, the sum of data values of respective thumbnails may be 1.

The controller 170 may determine whether the greatest data value is equal to or greater than a preset reference value after regression analysis (S205).

The reference value may be a value for setting matching accuracy, and as the reference value is increased, the matching accuracy may be increased. For example, the reference value may be 0.6.

When the greatest data value is equal to or greater than a preset reference value after regression analysis, the controller 170 may recognize a character corresponding to a thumbnail having the greatest data value as a matching character (S207).

This is because, when the greatest data value is equal to or greater than the preset reference value, the controller 170 determines that any one (a face image having the greatest data value) of the face images 911 to 917 of the characters is similar to the face image 811 in the current scene and that the other face images are not similar to the face image 811 in the current scene.

When the greatest data value is less than the preset reference value after regression analysis, the controller 170 may determine that it is not possible to recognize the matching character (S211).

This is because, when the greatest data value is less than the preset reference value, the face images 911 to 917 of the characters are relatively uniformly similar to the face image 811 in the current scene, and thus the controller 170 has difficulty in recognizing a specific character as a character in the current scene.

When the controller 170 operates according to the flowchart shown in FIG. 16, the recognition accuracy of the matching character may be advantageously improved.

FIG. 17 is merely exemplary, and the controller 170 may also acquire a matching character or a matching image using another method other than the method shown in FIG. 17.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:

1. A display device comprising:
   a display configured to display content;
   a wireless communication interface configured to receive character information of characters relating to the content;
   a user input interface configured to receive a character search command; and
   a controller configured to control the display to display thumbnails of the characters based on the character information,
   wherein the controller is further configured to, upon receiving the character search command:
   acquire content information relating to the content from an electronic program guide (EPG),
   acquire the character information of the characters in the content on a web based on the content information,
   acquire a matching image having a face most similar to a face image of a character in a current scene on the web,
   acquire a matching character based on the matching image, and
   display an indicator on a thumbnail corresponding to the matching character while the content is displayed.

2. The display device of claim 1, wherein the controller detects whether a scene is changed, and when the scene is not changed, the controller maintains the indicator.

3. The display device of claim 1, wherein the controller detects whether a scene is changed, determines whether a first face of a character in a changed scene is the same as a second face of the face image that is acquired before when the scene is changed, and maintains the indicator when the first face and the second face are the same.

4. The display device of claim 3, wherein, when the first face and the second face are not the same, the controller changes a position at which the indicator is displayed to a thumbnail corresponding to the second face.

5. The display device of claim 4, wherein, when the indicator is changed, the controller acquires a thumbnail having a face most similar to the second face among the thumbnails of the characters.

6. The display device of claim 1, wherein the controller acquires a face image of each of the characters from the thumbnails of the characters and acquires the matching character by comparing the face image of each of the characters with the face image of the character in the current scene.

7. The display device of claim 1, wherein the controller acquires a matching image having a face most similar to the face image of the character in the current scene on a web and acquires the matching character based on the matching image.

8. The display device of claim 1, wherein the controller acquires names of the characters in the character information, acquires a matching image having a face most similar to the face image of the character in the current scene among images of the characters having the names on a web, and acquires the matching character based on the matching image.

9. The display device of claim 1, wherein the controller calculates a data value indicating similarity between each of the characters and the character in the current scene and recognizes a character having a largest data value as the matching character.

10. The display device of claim 9, wherein, when a data value of the character having the largest data value is less than a preset reference value, the controller controls the display not to display the indicator.

11. The display device of claim 9, wherein, when a data value of the character having the largest data value is equal to or greater than a preset reference value, the controller controls the display to display the indicator on a thumbnail corresponding to the matching character.

12. The display device of claim 1, wherein the display displays the thumbnail of the matching character most similar to the face image of the character in the current scene among the thumbnails of the characters differently from a thumbnail of a remaining character except for the matching character.

13. The display device of claim 12, wherein the display displays the thumbnail of the matching character lighter than the thumbnail of the remaining character.

14. The display device of claim 1, wherein, when a plurality of characters is contained in the current scene, the controller controls the display to display a plurality of indicators on respective thumbnails corresponding to the plurality of characters among the thumbnails of the characters.

15. The display device of claim 1, wherein the controller acquires the matching character based on acquiring the character information in the matching image based on metadata included in the matching image.

\* \* \* \* \*